Aug. 27, 1968

H. O. RANGER 3,399,096

METHOD AND APPARATUS FOR FORMING REINFORCED
EDGES IN PACKAGING BLANKS

Filed Feb. 4, 1965

INVENTOR.
Hubert O. Ranger

BY Ward Haselton, McElhanney, Jno. Brooks & Kirkpatrick
ATTORNEYS

United States Patent Office 3,399,096
Patented Aug. 27, 1968

3,399,096
METHOD AND APPARATUS FOR FORM-
ING REINFORCED EDGES IN PACKAG-
ING BLANKS
Hubert O. Ranger, Ossining, N.Y., assignor to St. Regis
Paper Company, New York, N.Y., a corporation of
New York
Filed Feb. 4, 1965, Ser. No. 430,417
30 Claims. (Cl. 156—202)

ABSTRACT OF THE DISCLOSURE

A method and apparatus for making packaging blanks including taking a plurality of webs of substrate material in parallel, spaced relationship, and adhering to the surfaces of the webs a film having a width substantially equal to the total width of all the spaced webs.

---

This invention relates to packaging blanks and more particularly to the protection of the edges of packaging blanks.

Packaging blanks constructed in accordance with the concept of this invention are particularly adapted, among other possible uses, for use in packaging certain consumer commodities such as those containing powdered material, fluids, or the like. It is also desirable to employ the concepts of this invention in packaging commodities which are to be protected from the ingress or egress of air, moisture or liquids.

In essence, the present invention contemplates the provision of a new and improved method of making packaging blanks including taking a plurality of webs of substrate material and passing said webs in parallel, spaced apart relationship one with respect to the next adjacent one through a film coating station, taking a sheet of film having a width substantially equal to the total width of said plurality of webs and permanently adhering the film to the surfaces of the webs in the coating station. The next step includes removing the so-called, spaced webs of substrate material from said coating station, and subjecting same to subsequent operations which may include winding into a rewind roll.

The invention in one form thereof contemplates supplying the substrates from a single, wide roll, slitting the roll in a longitudinal direction at a plurality of locations across the width of the substrate, removing a narrow longitudinally extending strip from the substrate at each of the slitting locations, thereby forming a plurality of spaced longitudinally extending webs of substrate material which are thence fed to the film coating station.

The invention in another form thereof constitutes providing a single wide roll of substrate material, passing a web of this material past a plurality of spaced cutters which longitudinally cut the web into a plurality of elongated strips, passing the strips partially around guide means to thereby space the strips in spaced apart relationship one with respect to the next adjacent one. Thereafter, the so-spaced apart strips are directed to the film coating station.

In still another form of the invention, the substrate is supplied in the form of a plurality of independent rolls. Substrate material is unwound from each of the rolls and passed partially around guide means for aligning the material in parallel, spaced apart relationship one strip with respect to the next adjacent strip. Thence, the webs of substrates material are directed to the film coating station.

According to another embodiment of this invention, the film may be extruded from a die under heat and pressure, hot stretched and laid on a plurality of spaced webs of substrate material at a coating station, while the opposite surfaces of the webs of substrate material are subjected to vacuum. Thence, the so-coated webs of substrate material are passed through a cooling station to permanently bond the film to the substrate material.

Also according to this invention, the film may be fed from a roll of film and passed between pinch rolls to cause it to permanentely adhere to a plurality of spaced webs of substrate at the coating station. The film may be hot, cold, dry or have adhesive applied thereto to cause it to adhere to the webs of substrate material.

Further, according to the invention the film may be heated and the molecules therein oriented in a predetermined direction or pattern prior to being combined with the webs of substrate material.

In another form of the invention, after passing the so-coated substrate through the film coating station the process comprises directing the coated web to a slitting station where the film is longitudinally slit medially between the substrates, folding over the film around the longitudinal edge of the substrate and securing it to the opposite face thereof. Such securing may be effected by means of heat sealing or by applying adhesive to the surface of the film prior to its engagement with the back face of the substrate. Also, it is desirable with some materials to press the film to the back face between a pair of squeeze rollers. Thereafter, the so-coated webs of substrate material may be wound into individual rewind rolls, respectively. Alternately, all of the webs could be wound on a single rewind roll prior to slitting. Instead of winding the strips on rewind rolls, they may be passed directly to a fabricating machine, if desired.

A feature of this invention resides in the provision of new and improved packaging blanks which have improved edges.

Also, a feature of novelty of this invention is the provision of a package which prevents the passage or wicking of oils or moisture through the walls thereof, which prevents sifting of material therefrom, which prevents dust or dirt from entering, and which prevents fiber contamination of goods contained therein.

Another feature of this invention is the provision of new and improved packaging blanks the walls of which may be overlapped to form a fluid-tight seam without having the usual bulges, which may be readily heat-sealed, and which may be overlapped to form a more reliable seal.

It is a feature of novelty of the prevent invention to provide a new and improved method of making packaging blanks which is continuous, with which a thinner coating film may be employed, with which non-self-supporting films may be used, and which can be readily combined with other processes such as slitting and coating from an extruder, for example.

Another feature of the instant invention is the provision of a new and improved method of making packaging blanks which is economical, practical and reliable.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein.

Figure 1:
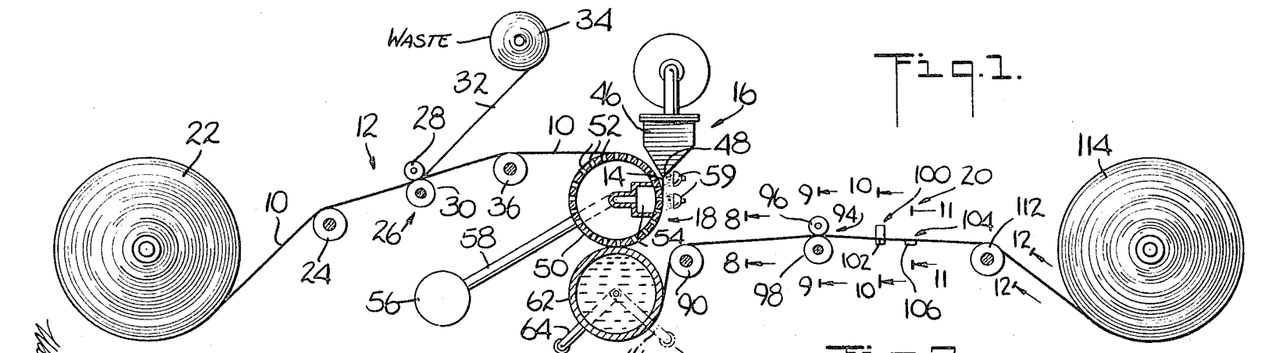
FIG. 1 is a side elevation showing packaging blank forming apparatus in accordance with the concept of this invention.
Figure 2:
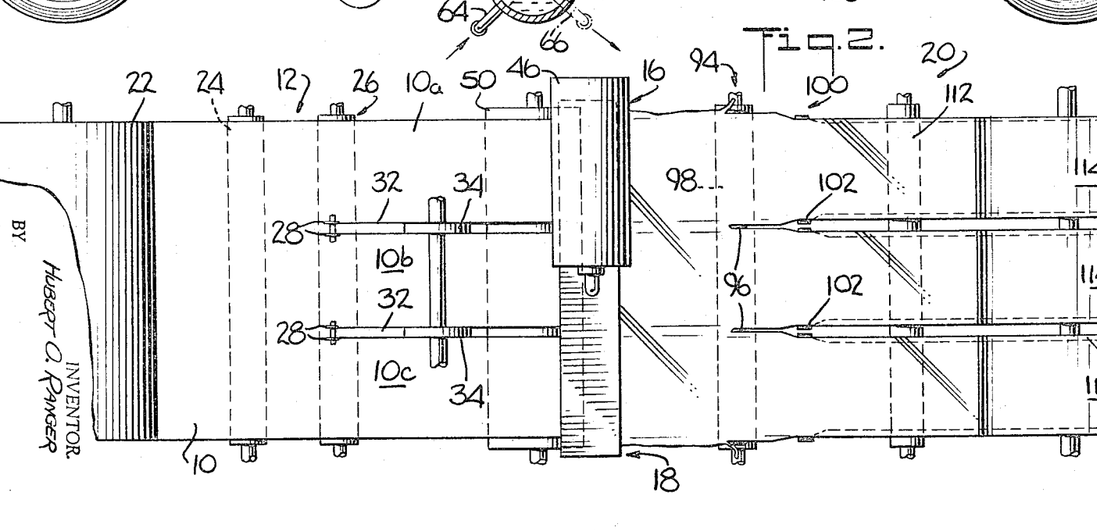
FIG. 2 is a plan view of the apparatus of FIG. 1.
Figure 3:
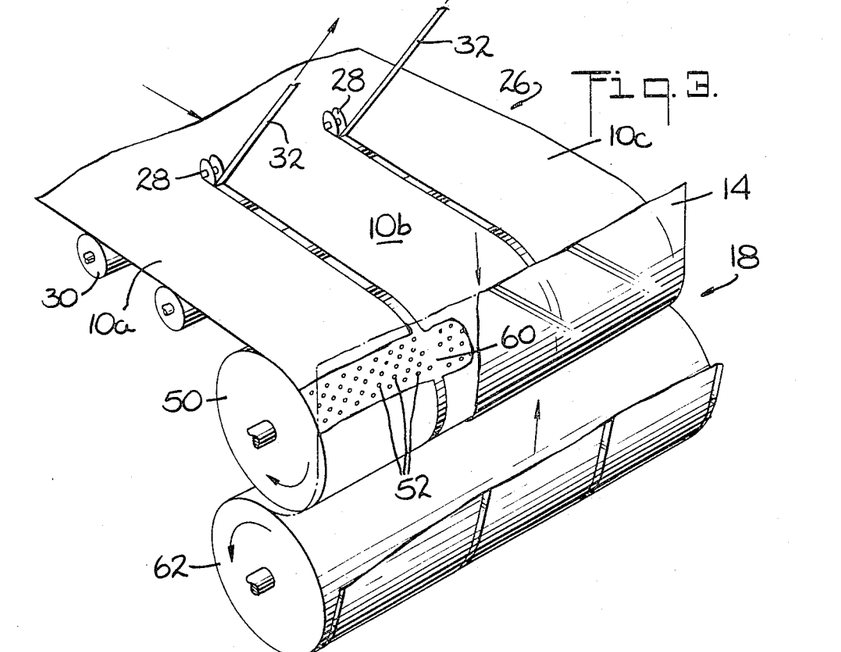
FIG. 3 is an enlarged perspective view showing the substrate slitting and the film coating stations.

In the form of the invention illustrated in FIGS. 1–3, substrate material is supplied to the machine from a supply source indicated generally at 12, FIGS. 1 and 2. Coating film material 14 is supplied to the machine from a film supply source indicated generally at 16, FIGS. 1 and 2. The film 14 and the substrate 10 are led to a film applying or coating station designated generally at 18, wherein the film coats the surface of and interconnects a plurality of spaced webs of substrate material. Thence, the so-coated webs are led to subsequent processing stations, indicated generally at 20, FIGS. 1 and 2.

Referring to FIGS. 1 and 2 in more detail, a web of substrate material 10 is unwound from a relatively wide supply roll 22, led past a guide roller 24 to a cutting station 26 comprising a series of pairs of cutting wheels 28 which operate against a back-up roll 30 to cut longitudinally extending narrow strips from the web of substrate material 10. The narrow strips 32 are removed as waste material from the machine and wound on rewind rolls 34, as a convenient means of disposal. In this manner, a plurality of spaced, sub-webs of substrate material are formed, three being shown in FIGS. 2 and 3 at 10a, 10b, and 10c. Following this operation, the subwebs are fed over guide roll 36, FIG. 1, to the film coating station 18. It will be appreciated that the webs of substrate material are disposed in parallel, spaced apart relationship one with respect to the next adjacent one as they enter the film coating station.

Figures 4, 5:
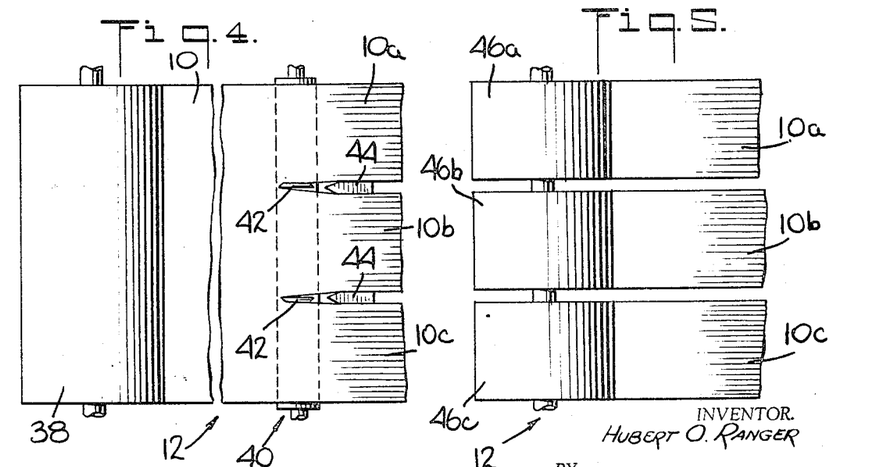
FIG. 4 is an enlarged plan view of the substrate slitting means.
FIG. 5 is an enlarged plan view of another form of the invention wherein separate webs are fed and guided into the machine.

The invention in another form thereof is illustrated in FIG. 4, wherein the substrate material 10 is supplied in a different manner. In this form, the material is fed from a wide supply roll 38, to a cutting station 40, wherein knives 42 longitudinally slit the material, forming sub-webs 10a, 10b and 10c. These sub-webs are spread apart one with respect to the next adjacent one by means of guides or plows 44, FIG. 4. Thence, the so-spaced sub-webs 10a, 10b, and 10c, are led to the film coating station 18 of FIG. 1.

Further, FIG. 5 illustrates still another form of the invention wherein the web material is supplied from three separate narrow supply rolls 46a, 46b, and 46c which are mounted one with respect to the other in such a manner that the individual webs of substrate material are unwound in parallelly disposed, spaced relationship. Thence, the webs of substrate material 10 are fed to the film coating station of FIG. 1, in the same manner as described hereinbefore.

Referring back to FIG. 1, the plastic film or coating material 14 is supplied in the form of a sheet to the machine from a supply source 16. This supply source may comprise an extruder 46 which is under heat and pressure and which serves to extrude a film of plastic material through a slotted orifice die 48. Thence, the film of plastic material passes to the film applying or coating station 18. The plastic film may be stretched while passing from the die 48 to the coating station 18. This is done by progressively feeding the webs of substrate material 10 past the coating station 18 at a rate exceeding the rate of the plastic film extrusion. As seen in FIGS. 1 and 3, this station comprises a suction or vacuum roll 50 having a plurality of radially disposed openings 52. The center of the roll 50 is provided with a stationary vacuum chamber 54, FIG. 1, which is connected with a source of vacuum 56 through a conduit 58. Heaters 59 may be used to influence the viscosity and adhesion of the plastic film 14, as desired. In operation the spaced webs of porous substrate material move over the surface of the rotating vacuum roll 50 while simultaneously the plastic film as extruded is fed into surface contact with the substrate while suction is applied to the opposite surface of the substrate material to draw the film into continuous engagement with the webs of substrate material. Sufficient vacuum is applied to the opposite surface of the web from a location just before the coating line and extending to a location beyond the coating line in the coating station to prevent the formation of air blisters and to draw said film into intimate engagement with said web. As best seen in FIG. 3, the portion 60 of the vacuum roll 50 corresponding to the space between the webs of substrate material is not provided with openings 52 so that the film material 14 will not stick thereto during operation. While various parameters may be employed in this method, it has been found that when hot extruding a resin into a plastic film a weight between about 2 and about 35 pounds per 3,000 square feet of surface of the substrate material is desirable. It will be appreciated that according to this form of the invention a thin, unsupported film may be employed. Further, it has been found desirable to space the extruding die 48 a distance between about ¼ inch and about 8 inches from the vacuum roll 50, FIG. 1. Still further, it is preferred that the speed of the feed of the webs of substrate material through the film coating station 18 is between about 100 and about 1500 feet per minute.

Thereafter, the so-coated web is fed past a cooling station which comprises a water cooled roll 62, FIG. 1, having an inlet connection 64 and an outlet connection 66. The temperature of the cooling station is maintained sufficiently low in order to cool the film below its setting temperature, to thereby permanently bond the film to the webs of substrate material. Satisfactory methods and apparatus for coating the substrate material are set forth in the United States patent application Ser. No. 15,451, filed Mar. 16, 1960, now Patent No. 3,165,432.

Figures 6, 7, 13, 15, 16, 17, 18:
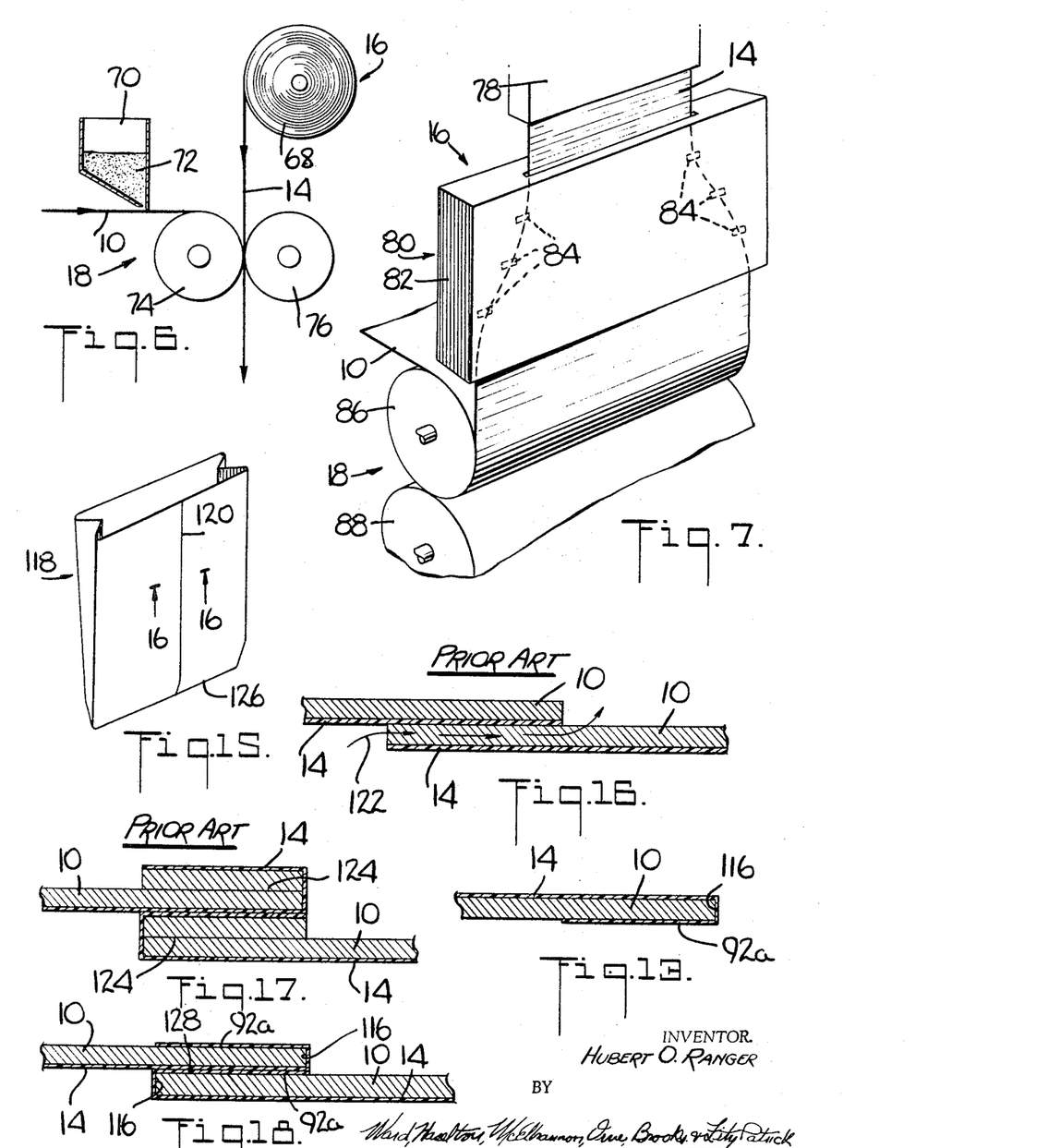
FIG. 6 is an enlarged side elevation of adhesive applying means disposed adjacent a pair of pinch rolls forming a film applying station according to one form of this invention.
FIG. 7 is a film orienting station disposed adjacent a pair of pinch rollers forming a film coating station according to another form of this invention.
FIG. 13 is an enlarged view showing the edge portion of a substrate with a film folded around and adhered to the back surface according to the concept of this invention.
FIG. 15 is a perspective view of a tubular package constructed from a blank according to this invention.
FIG. 16 is an enlarged sectional view indicated at 16—16 in FIG. 15, and showing the longitudinal seam formed with film coated substrates constructed according to prior art methods.
FIG. 17 is a sectional view similar to FIG. 16, but showing another form of seam formed with film coated substrates constructed according to another prior art method.
FIG. 18 is a sectional view similar to FIG. 16, but showing a seam formed with a film coated substrate according to the concepts of this invention.

With reference to FIG. 6, there is illustrated another form of the invention, wherein film supply means 16 comprise a wide roll 68 of film material which is unwound to supply a plastic film to the film coating station 18. As shown in FIG. 6, this station comprises a source of adhesive supply 70 which is adapted to apply adhesive 72 to the surface of the substrate 10 passing adjacent thereto. The substrate 10 and the film 14 are thence passed between a pair of pinch rolls 74 and 76 to permanently adhere the film to the substrate. It is noted that when employing certain materials the pinch rolls 74 and 76 may be heated in a known manner. It will be further appreciated that the substrate 10 may be supplied with a pre-coating of adhesive material on the surface thereof so that the adhesive supply 70 could be dispensed with. In this case the heat or pressure of the pinch rolls serve to activate the adhesive material. The sheet of film material may be adhered to the webs of substrate material when either or both of the materials are cold, heated, dry, wetted, or coated with adhesive without departing from the concept of this invention.

Still another form of the invention is illustrated in FIG. 7 wherein the film supply means 16 comprises a member 78 which can be in the form of an extruder similar to extruder 46 of FIG. 1 described hereinbefore, or in the form of a heated chamber which heats the film as supplied from a supply roll such as roll 68, FIG. 6, described hereinbefore. As seen in FIG. 7, the heated film 14 passes from the member 78 and is guided into an orientation station 80 which includes a chamber 82 having clips 84 which engage the edge of the film to thereby orient the molecules of the film material according to a pre-programmed pattern. Thereafter, the so-oriented film is fed to the film coating station 18 where it is brought into engagement with the substrate 10 and passed between pinch rollers 86 and 88.

Figure 8:
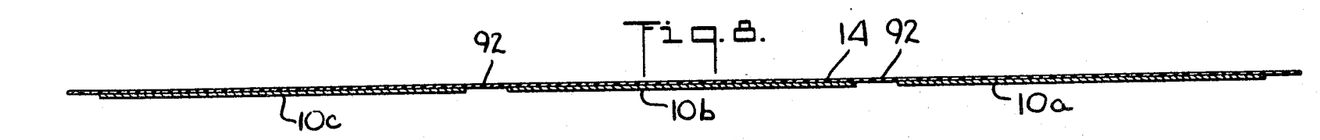
FIG. 8 is an enlarged sectional view of the web and film taken along the line 8—8 of FIG. 1 and showing a plurality of substrates interconnected by a superimposed web of film subsequent to the film applying station.

Referring back to FIG. 1, after the coated webs of substrate material pass from the film coating station 18, they are passed around a guide roll 90 and to a series of processing stations 20. The so-coated webs of substrate material, after it leaves the coating station 18 has the appearance as best seen in FIG. 8. It will be noted that the coated substrate material includes a plurality of webs or sub-webs, three being shown at 10a, 10b, and 10c which are spaced apart one from the other, but are interconnected by means of the film 14 as at 92. The width of the spacing 92 is preferably between about ¼ and about ½ inch which provides sufficient material for an overlapping length of material of between about ⅛ inch and about ¼ inch to be folded over the edge of each web of substrate material as will be described more fully hereinafter. After the web has passed around guide roll 90, FIG. 1, it passed to a cutting or slitting station 94, FIGS. 1 and 2, which comprise a series of spaced cutting wheels 96 which operate against the backup rolls 98 to slot the film 10 medially of the portion 92, FIG. 9.

Thereafter, the so-slit film coated substrate passes to the folding station designated generally at 100 in FIGS. 1 and 2. In this station members 102 fold the portions 92a, FIG. 10, of the film 14 around the edges of the substrates 10a, 10b and 10c until they engage the back surface thereof, respectively.

After the portions 92a have been folded in the folding station 100, the coated substrate passes to the sealing station 104, FIG. 1. This station includes pressing and heating means 106, FIG. 11, which adheres and may heat seal portions 92a to the back surface of the substrate material.

Figures 9, 10, 11, 12, 14:
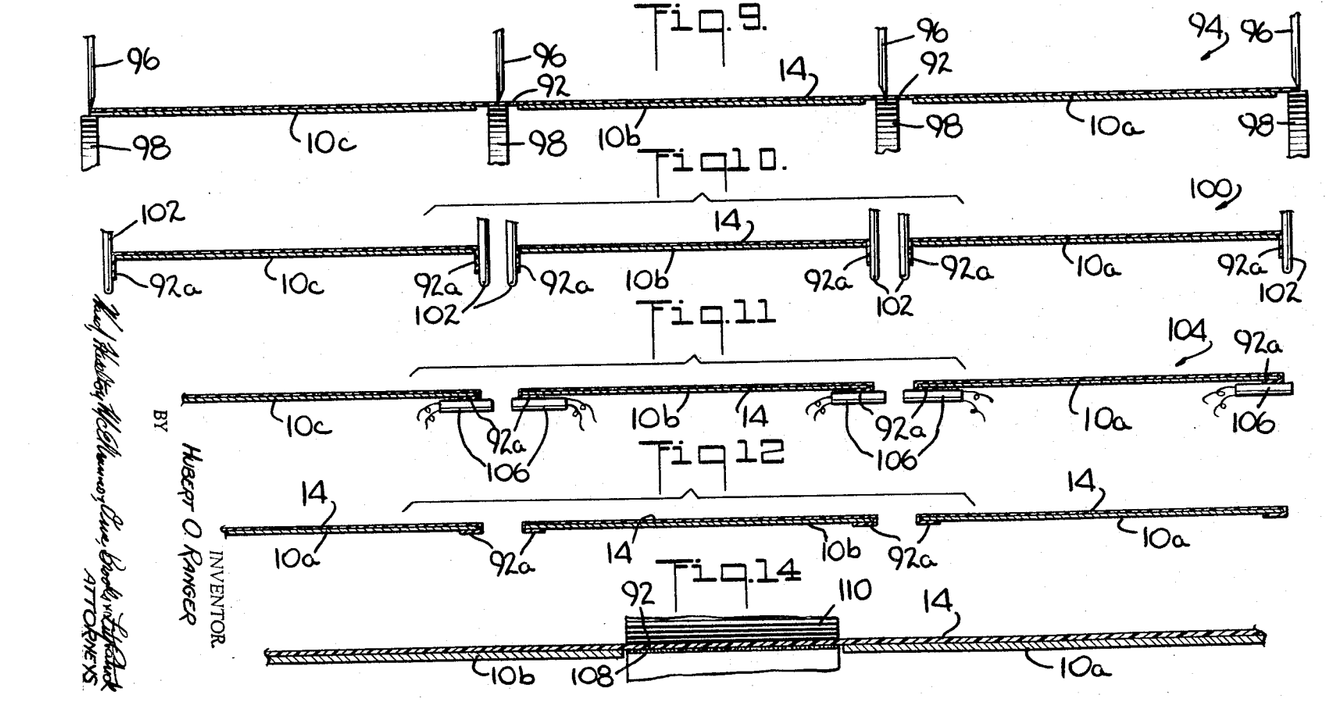
FIG. 9 is an enlarged sectional view of the web taken along the line 9—9 of FIG. 1 at the slitting station wherein the film is longitudinally slit.
FIG. 10 is an enlarged sectional view of the web and film taken along the line 10—10 of FIG. 1 and showing a folding station wherein the film material is folded around the edges of the webs of substrate material, respectively.
FIG. 11 is an enlarged sectional view of the web and film taken along the line 11—11 of FIG. 1 and showing heat sealing of the overlapped portions of film to the back surfaces of the webs, respectively.
FIG. 12 is an enlarged sectional view of the web and film taken along the line 12—12 of FIG. 1 and showing the coated webs of substrate material just prior to the rewinding step.
FIG. 14 is an enlarged view of another form of the invention, showing a plurality of webs of substrate material interconnected by a sheet of film with the application of glue to the interconnecting portion of the film.

Referring to FIG. 14, this figure illustrates another form of the invention wherein adhesive materials, such as glue 108, are applied by applicator means 110 to portion 92 of the film 14 prior to cutting same in the cutting station 94, FIG. 1. In this form of the invention, the portion 92 is slit in the same manner as hereinbefore described and the overlapping portions are folded around and adhered to the back surface of the substrate material. Pressure or heat as described in connection with the sealing station 104 may be applied to permanently adhere the overlapping portions.

Referring back to FIG. 1, after the film coating substrate has passed through the sealing station 104, it moves over guide roller 112 and is wound up on rewind rolls 114, the so-treated film coated substarte as it passes over guide roll 112 having the appearance as illustrated in FIG. 12.

An enlarged view of the protected edge of the substrate material formed according to this invention is best seen in FIG. 13. It will be appreciated that the end edge 116 is completely covered so that loose fibers cannot be lost therefrom, thereby preventing fiber contamination of a product contained within the fabricated package.

FIG. 15 illustrates a tubular package 118 fabricated from laminated material and having a longitudinal seam 120. FIG. 16 is an enlarged view of the longitudinal seam constructed in accordance with the concepts of the prior art. Particular attention is directed to the arrows 122 which indicate the path of the flow due to the wicking action of the open ended substrate material 10. Hence, it is seen that fluid may readily pass into or out of a container fabricated from blanks constructed according to this prior art. Also, it will be appreciated that the substrate material 10 may tend to absorb this moisture and thereby deteriorate.

In order to overcome the so-called "wicking action" of the prior art as illustrated in FIG. 16, both end edges of the material may be folded over as at 124 to form a seam according to another form of the prior art as illustrated in FIG. 17. However, this form of the prior art was not very satisfactory due to the fact that a bulky or very thick seam was required, this factor being particularly detrimental when thick or multiple plies of material are employed. Such a bulky seam makes it difficult to form the end of a package as at 126, FIG. 15. As best seen in FIG. 18, a seam is illustrated according to the concept of this invention. It will be appreciated that the seam 128 may be readily and reliably heat sealed due to the fact that the heat must only penetrate through a one layer wall thickness to reach the film material. Further, it will be appreciated that the ends 116 of the substrate are completely encased, thereby preventing fiber contamination and wicking action.

The substrate 10 may be fabricated from one of many different types of materials. It may be porous or it may be non-porous. It may be in the form of paper, cloth, plastic or the like, for example. The film 14 may also be fabricated from many different types of materials and it may be porous or non-porous. For example, such materials include polyolefins such as polyethylene and polypropylene, polyamides such as nylon and polyesters such as polyalkylene derivatives of polycarboxylic acids especially polyethylene terephthalate. Homopolymers and copolymers and blends of these materials are suitable. Materials of this nature which can be extrusion coated are particularly desirable.

Although particular embodiments of the invention are herein disclosed for purposes of explanation, various modifications thereof, after study of this specification, will be apparent to those skilled in the art to which the invention pertains, reference should accordingly be had to the appended claims in determining the scope of the invention.

What is claimed and desired to be secured by Letters Patent is:

1. A method of manufacturing packaging blanks comprising passing a plurality of webs of substrate material in parallel, spaced apart relationship one with respect to the next adjacent one through a film coating station, permanently adhering a sheet of plastic film, having a width substantially equal to the total width of said plurality of webs, to the surfaces of the webs of substrate material in said coating station, removing the adhered film and said spaced webs of substrate material from the coating station, longitudinally slitting said film substantially medially of the spaces between the webs of substrate material forming overlapping portions of film, and folding over said overlapping portions of film around the adjacent edges of the webs to engage the back surface of said webs of substrate material respectively.

2. A method of manufacturing packaging blanks comprising unwinding a roll of substrate material, removing a plurality of narrow, spaced apart strips from said substrate material forming a plurality of webs of substrate material, passing the webs in parallel, spaced apart relationship one with respect to the next adjacent one through a film coating station, permanently adhering a sheet of plastic film having a width substantially equal to the total width of said plurality of spaced webs to the surfaces of said webs of substrate material in the coating station, removing the adhered film and said spaced webs of substrate material from the coating station, longitudinally slitting said film substantially medially of the space between said webs of substrate material forming overlapping portions of film, and folding over the overlapping portions of film around the adjacent edges of the webs to engage the back surface of said webs of substrate material respectively.

3. A method of manufacturing packaging blanks comprising unwinding a roll of substrate material, passing said substrate material adjacent a plurality of spaced apart pairs of cutting means, removing a plurality of spaced apart narrow strips of substrate material from said cutting means to thereby form a plurality of webs of substrate material, passing said webs in parallel, spaced apart relationship, one with respect to the next adjacent one through a film coating station, permanently adhering a sheet of plastic film having a width substantially equal to the total width of said plurality of spaced webs to the surfaces of the webs of substrate material in the coating station respectively, then longitudinally slitting said film substantially medially of the space between the webs of substrate material leaving overlapping portions of film, folding over said overlapping portions of film around the adjacent edges of the webs to engage the back surfaces of the webs of substrate material respectively, and permanently adhering the overlapping portions of film to the back surfaces of the webs respectively.

4. A method of manufacturing packaging blanks comprising unwinding a roll of substrate material, longitudinally slitting said roll of substrate material into a plurality of webs, separating said webs of substrate material into parallel, spaced apart relationship one with respect to the next adjacent one and then passing said webs through a film coating station, permanently adhering a sheet of plastic film having a width substantially equal to the total width of the plurality of webs so spaced to the surfaces of the webs of substrate material in the coating station, removing the adhered film and said spaced webs of substrate material from the coating station, longitudinally slitting said film substantially medially of the space between said webs leaving overlapping portions of film, folding over the overlapping portions of film around the adjacent edge of the webs to engage the back surface of the webs of substrate material respectively.

5. A method of manufacturing packaging blanks comprising unwinding a plurality of individual rolls of substrate material and guiding the webs of substrate material in parallel, spaced apart relationship one with respect to the next adjacent one, passing said so disposed webs through a film coating station, adhering a sheet of plastic film having a width substantially equal to the total width of the plurality of spaced webs to the surfaces of said webs in the coating station, removing said film and spaced webs of substrate material from the coating station, longitudinally slitting said film substantially medially of the space between the webs of substrate material forming overlapping portions of film, folding over said overlapping portions of film around the adjacent edge to engage the back surface of the webs of substrate material respectively, adhering the overlapping portions of film to the back surfaces respectively, and forming a rewind roll of each of the webs of substrate material with its film.

6. A method of manufacturing packaging blanks comprising passing a plurality of webs of substrate material in parallel, spaced apart relationship one with respect to the next adjacent one through a coating station, continuously extruding a thin coating of thermoplastic resin in a viscous condition through a slotted orifice forming a plastic sheet, passing the sheet through an air gap between the orifice and the coating station, hot stretching the sheet while passing through said air gap, and feeding said hot stretched sheet into contact with the surfaces of said webs at the coating station while applying a vacuum to the opposite surfaces of the webs, thereby adhering said sheet to said webs.

7. A method of manufacturing packaging blanks comprising passing a plurality of porous webs of substrate material in parallel, spaced apart relationship one with respect to the next adjacent one through a coating station, continuously extruding a thermoplastic resin in a viscous condition through an orifice forming a plastic sheet of a width substantially equal to the total width of said plurality of spaced webs, passing the sheet through an air gap between said orifice and said coating station, feeding the sheet into contact with surfaces of the webs of substrate material at the coating station while applying a vacuum to the opposite surfaces of the webs respectively to thereby permanently adhere said sheet to said surfaces, removing the sheet and spaced webs from the coating station, longitudinally slitting the sheet substantially medially of the space between the webs forming overlapping portions of film, folding over said overlapping portions of sheet around the adjacent edge to engage the back surface of the webs of substrate material respectively.

8. The method of progressively manufacturing packaging blanks comprising continuously hot extruding thermoplastic resin through a slotted orifice to form a plastic sheet and feeding said sheet into contact with the surfaces of a plurality of porous webs of substrate material disposed in parallel, spaced apart relationship one with respect to the other at a coating station spaced from said orifice, and while progressively feeding said webs past the station at rates exceeding the rates of the resin extrusion, and while applying a gas pressure differential over an area of the webs of lower pressure on the web surfaces opposite the plastic sheet respectively, thereby bonding said plastic sheet to said webs respectively.

9. The method of manufacturing packaging blanks comprising continuously hot extruding a thermoplastic resin through a slotted orifice to form a plastic sheet and feeding said sheet into contact with the surfaces of a plurality of parallelly disposed spaced apart webs of substrate material at a coating station spaced from said orifice, and while progressively feeding said webs past said station at a rate exceeding the rate of said resin extrusion, thereby to hot stretch said plastic sheet prior to application to said webs, and while applying a gas pressure differential over an area of the webs of lower pressure on the web surfaces opposite the plastic sheet respectively, and thereafter progressively cooling the web and plastic sheet below the setting temperature of said resin to permanently bond the plastic sheet to the webs, respectively, longitudinally slitting the sheet substantially medially of said space between the webs of substrate material forming overlapping portions of plastic sheet, folding over said overlapping portions around the adjacent edge to engage the back surface of the webs of substrate material respectively.

10. A method of making packaging blanks comprising continuously hot extruding thermoplastic resin to form a plastic film at an extruding station, and while progressively feeding a plurality of webs of porous and fibrous material disposed in parallel spaced apart relationship one with respect to the others past a coating station spaced from said extruding station, feeding the plastic film as extruded into surface contact with surfaces of the webs at said coating station respectively while applying sufficient vacuum to the opposite surfaces of the webs to draw the film into substantially continuous surface engagement with the webs and embed surface fibers of the webs in said plastic film, and feeding the webs and film then past a cooling station maintained at a temperature sufficiently low to cool the film below the setting temperature of the resin, thereby permanently bonding the film to the web, then longitudinally slitting the film substantially medially of said space between the webs forming overlapping portions of film, folding over the overlapping portions of film around the adjacent edge to engage the back surface of the webs of substrate material respectively.

11. A method of manufacturing packaging blanks comprising passing a plurality of webs of substrate material in parallel, spaced apart relationship one with respect to the next adjacent one through a film coating station, applying adhesive material to the surface of said webs, passing a sheet of plastic film material having a width substantially equal to the total width of said plurality of spaced webs along with said webs of substrate material between pinch rolls with the adhesive surface being disposed adjacent the film surface to permanently adhere said film to the surfaces of the webs of substrate material, and removing said film and spaced webs of substrate material from the coating station.

12. A method of manufacturing packaging blanks comprising passing a plurality of webs of substrate material in parallel, spaced apart relationship one with respect to the next adjacent one through a film coating station, simultaneously passing a sheet of plastic film having a width substantially equal to the total width of said plurality of spaced webs of substrate material and the webs of substrate material between a pair of pinch rolls while simultaneously subjecting said materials to heat and pressure to thereby permanently adhere said film to the surfaces of said webs respectively, removing the adhered film and spaced webs of substrate material from said coating station, longitudinally slitting said film substantially medially of said space between the webs of substrate material forming overlapping portions of film, and folding over said overlapping portions of film around the adjacent edges of the webs to engage the back surfaces of the webs of substrate material, respectively.

13. A method of manufacturing packaging blanks comprising passing a plurality of webs of substrate material having adhesive applied to the surfaces thereof in parallel spaced apart relationship one with respect to the next adjacent one through a film coating station, removing plastic film from a roll of plastic film having a width substantially equal to the total width of said plurality of spaced webs of substrate material, and passing said film and substrate material between a pair of pinch rolls and subjecting said materials to heat and pressure to thereby permanently adhere said film to the surfaces of said webs of substrate material respectively, then longitudinally slitting said film substantially medially of said space between said webs of substrate material forming overlapping portions of film, folding said overlapping portions of film around the adjacent edges to engage the back surfaces of the webs of substrate material respectively, and adhering said overlapping portions of film to said back surfaces respectively.

14. A method of making packaging blanks comprising passing a plurality of webs of substrate material in parallel, spaced apart relationship one with respect to the next adjacent one through a film coating station, subjecting a sheet of film to heat, orienting the molecular structure of said film, passing said so-oriented film and said webs of substrate meaterial between a pair of squeeze rolls to permanently adhere said film to the surfaces of said webs of substrate material, longitudinally slitting said film substantially medially of said space between said webs of substrate material forming overlapping portions of film, folding said overlapping portions of film around the adjacent edges to engage the back surfaces of said webs of material, respectively.

15. A method of making packaging blanks comprising positioning a plurality of webs of substrate material in parallel, spaced apart relationship one with respect to the next adjacent one, continuously hot extruding thermoplastic resin to form a plastic film at an extruding station, orienting the molecular structure of said film, simultaneously passing said so-oriented film and said webs of substrate material between a pair of squeeze rolls to permanently adhere said film to the surfaces of said webs of substrate material, longitudinally slitting said film substantially medially of said space between the webs of substrate material forming overlapping portions of film, folding over the overlapping portions of film around the adjacent edges to engage the back surfaces of the webs of substrate material respectively, and adhering the overlapping portions of film to said back surfaces, respectively.

16. A method of manufacturing packaging blanks comprising passing a plurality of webs of substrate material in parallel, spaced apart relationship one with respect to the next adjacent one through a film coating station, permanently adhering a sheet of plastic film having a width substantially equal to the total width of said plurality of spaced webs to the surfaces of the webs in the coating station, removing the adhered film and said spaced webs of substrate material from the coating station, then longitudinally slitting said film substantially medially of said space between the webs of substrate material forming overlapping portions of film, folding over the overlapping portions of film around the adjacent edges of the webs to engage the back surfaces of the webs of substrate material, adhering said overlapping portions of film to said back surfaces respectively, and winding each of said webs of substrate material into a rewind roll.

17. A method of making packaging blanks comprising passing a plurality of webs of substrate material in parallel, spaced apart relationship one with respect to the next adjacent one through a film coating station, continuously extruding a thermoplastic resin chosen from the group consisting of polyethylene, polypropylene and polyamides of the nylon type in a viscous condition through a die to produce a coating film having a weight between about 2 and about 35 pounds per 3,000 sq. feet of web surface, while moving the webs of substrate material relative to the die at a speed of between about 100 and about 1500 feet per minute, at a coating line spreading the film on the surface of said webs following the natural surface contour of the webs while applying sufficient vacuum to the opposite surface of the webs from a location just before said coating line and extending to a location beyond said coating line in said coating station sufficient to prevent the formation of air blisters and to draw said film into intimate engagement with said webs, and feeding the webs and film past a cooling station maintained at a temperature sufficiently low to cool said film below the setting temperature of said resin, and thereby permanently bonding the film to the webs, then longitudinally slitting said film substantially medially of said space between the webs of substrate material forming overlapping portions of film, folding over said overlapping portions of film around the adjacent edge to engage the back surface of the webs of substrate material respectively, adhering said overlapping portions of film to said back surfaces respectively and winding each of the webs into rewind rolls respectively.

18. A method of making packaging blanks comprising slitting a roll of substrate material into a plurality of webs, passing said webs in parallel spaced apart relationship one with respect to the next adjacent one through a film coating station, heating a thermoplastic resin, continuously extruding said resin in a viscous condition through a slotted orifice forming a thin plastic film, passing said film through an air gap between said orifice and the coating station, hot stretching said film while passing through said air gap, feeding said hot stretched film into contact with the surfaces of the webs at said coating station while applying a vacuum to the opposite surfaces of the webs, removing said film and spaced webs of substrate material from the coating station, longitudinally slitting said film substantially medially of said space between the webs forming overlapping portions of film, folding over said overlapping portions of film around the adjacent edge to engage the back surface of said webs of substrate material respectively, adhering said overlapping portions of film to the back surfaces respectively, and winding said substrate material into rewind rolls, respectively.

19. Apparatus for manufacturing packaging blanks comprising a film coating station, means for guiding a plurality of webs of substrate material in parallel, spaced apart relationship one with respect to the next adjacent one, through said film coating station, means for guiding a sheet of plastic film material through said film coating station, means disposed in said coating station for permanently adhering said film to the webs, means for slitting said film substantially medially of said space between the webs forming overlapping portions of film, means for guiding and folding over the overlapping portions of film around the adjacent edges of the webs to engage the back surfaces of the webs, respectively.

20. Apparatus for manufacturing packaging blanks comprising a film coating station, means for moving a plurality of webs of substrate material to the film coating station, means for moving a sheet of plastic film having a width substantially equal to the total width of said plurality of webs to the coating station, means for bonding said film to said substrate material at the coating station, means for moving said film and substrate material to a slitting station, slitting means disposed within said slitting station for longitudinally slitting said film substantially medially of said space between the webs forming overlapping portions of film, moving said substrate material to a folding station, means for folding over said overlapping portions of film around the adjacent edges to engage the back surfaces of said webs of substrate material respectively, moving said substrate material to a bonding station, means for adhering said overlapping portions of film to said back surfaces respectively.

21. Apparatus for manufacturing packaging blanks comprising means for unwinding substrate material from a roll, means for moving said substrate material to a slitting station, a plurality of spaced apart pairs of slitting blades, the first blade of each pair being disposed in closely spaced relationship with respect to the second blade of each pair respectively for forming a plurality of webs of substrate material disposed in parallel, spaced apart relationship one with respect to the next adjacent one, means for moving said web to a film coating station, means for feeding a plastic film having a width substantially equal to the total width of said plurality of spaced webs, into said coating station, means disposed within said coating station for permanently adhering said film to said webs of substrate material, means for moving said film and substrate material to a slitting station, means for longitudinally slitting said film substantially medially of said space between said webs of substrate material forming overlapping portions of film, means for folding over the overlapping portions of film around the adjacent edges to engage the back surfaces of the webs of substrate material, respectively.

22. Apparatus for making packaging blanks comprising a slitting station, means for removing a wide web of substrate material from a roll, and feeding it to a slitting station, slitting knives for longitudinally slitting said material as it passes through said station, deflecting members for separating the webs of substrate material to parallel, spaced apart positions, a film coating station, means for moving the webs to the film coating station, means disposed within said station for bonding a sheet of plastic film having a width substantially equal to the total width of the plurality of spaced webs, means disposed adjacent said coating station for longitudinally slitting said film substantially medially of said space between the webs of substrate material forming overlapping portions of film, deflecting members for folding over said overlapping portions of film around the adjacent edges to engage the back surfaces of the webs of substrate material respectively, and heating means for bonding said overlapping portions of film to said back surfaces respectively.

23. Apparatus for manufacturing packaging blanks comprising an extruder for extruding a thermoplastic resin film, a coating station disposed in spaced relationship with respect to the mouth of said extruder, means for moving a plurality of parallelly disposed spaced webs of substrate material through said coating station at a preselected speed in excess of the speed of extrusion of said film, means for applying vacuum beneath said moving webs at said coating station, to draw the film into engagement with said webs and cooling means disposed subsequent to said coating station for permanently bonding said film to said webs.

24. Apparatus for the manufacture of packaging blanks comprising an extruder, a die associated with said extruder for extruding a thin film of thermoplastic resin, a suction chamber, means for moving a plurality of parallelly disposed, spaced apart, porous webs past said suction chamber at a speed in excess of the rate of extrusion of said resin, said die and said suction chamber being disposed one with respect to the other to feed said film into engagement with the surfaces of said webs, respectively, adjacent said suction chamber, said suction chamber having openings of sufficient size to effect suction pressure upon said webs substantially prior to and after engagement with said film, cooling means disposed adjacent said suction chamber for permanently bonding said film to said webs, and means for cooling the cooling means, slitting means disposed adjacent said cooling means for slitting said film substantially medially of said space between the webs of substrate material forming overlapping portions of film, and folding members for folding over said overlapping portions of film around the adjacent edge to engage the back surface of the webs of substrate material, respectively.

25. In apparatus for making packaging blanks the combination comprising an extruder for extruding a thermoplastic resin film of uniform thickness upon a plurality of moving porous webs disposed in parallel spaced apart one with respect to the other relationship, means for moving said porous webs past a coating station, the latter being positioned adjacent the mouth of said extruder for applying the thermoplastic film across all of the moving webs in a single sheet, said extruder being located relative to the coating station to produce a hot stretch gap, means for applying vacuum beneath said moving webs at said coating station, means situated adjacent said coating station for receiving said webs and applied film and for cooling said film below the solidification point thereof, means situated adjacent the means for cooling for receiving the cooled film and webs and for slitting said film substantially medially of said space between the webs of substrate material forming overlapping portions of film, means adjacent said slitting means for receiving the webs and slitted film and for folding over said overlapping portions of film around the adjacent edges to engage the back surfaces of said webs of substrate material respectively and means for adhering said overlapping portions of film to said back surfaces respectively.

26. Apparatus for making packaging blanks comprising an extruder having a die for extruding a coating film of thermoplastic resin chosen from the group consisting of polyethylene, polypropylene and polyamides of the nylon type, a coating station disposed between about ¼ inch and 8 inches from said die, means for feeding a plurality of parallelly disposed, spaced apart webs of sheet material past said coating station at a speed in excess of the speed of extension of said coating film to hot stretch said film to a weight between about 2 and and about 35 pounds per 3,000 sq. ft. of web surface, said speed being between about 100 and about 1500 feet per minute with respect to said die, means for guiding said webs in a film receiving attitude for receiving said film, means for applying vacuum beneath said moving webs at said coating station, and cooling means adjacent the coating station for receiving the coated webs and for permanently bonding said film to said webs, means disposed adjacent the cooling means for receiving the cooled film and webs and for slitting said film substantially medially of said space between the webs forming overlapping portions of film, means disposed adjacent said slitting means receiving the slitted film and webs and for folding over said overlapping portions of film around the adjacent edges to engage the back surfaces of said webs of substrate material, respectively.

27. In apparatus for making packaging blanks, the combination comprising a film coating station, means for moving a plurality of webs of substrate material in parallel, spaced apart relationship one with respect to the next adjacent one to the film coating station, means disposed prior to said film coating station for applying a coating of adhesive to the surfaces of said webs of substrate material respectively, means for moving a sheet of film having a width substantially equal to the total width of said plurality of spaced webs of substrate material to the film coating station, said film coating station including a pair of pinch rollers for pressing and bonding said film with said webs of substrate material, means disposed adjacent the coating station for receiving the coated webs and for slitting said film substantially medially of said space between the webs of substrate material forming overlapping portions of film, folding members disposed adjacent said slitting means for receiving the slitted film and webs and for folding over said overlapping portions of film around the edges to engage the back surfaces of the webs of substrate material, respectively.

28. In apparatus for making packaging blanks, the combination comprising a film coating station, means for feeding a plurality of substarte material in parallel, spaced apart relationship one with respect to the next adjacent one to the film coating station, means for heating a wide plastic film of web material, means for molecularly orienting the film, means for moving the film to the film coating station, a pair of pinch rolls being disposed in the film coating station for simultaneously pressing the webs of substrate material and said film therebetween to permanently bond one to the other respectively, slitting means disposed adjacent the coating station for receiving the coated webs and for slitting the film substantially medially of said space between said webs forming overlapping portions of film, means disposed adjacent the slitting means for receiving the slitted film and webs and for engaging said overlapping portions of film and positioning said film around the adjacent edges to engage the back surfaces of said webs, respectively.

29. In apparatus for making packaging blanks, the combination including a slitting station for longitudinally slitting porous substrate material forming a plurality of parallelly disposed porous webs of substrate material in spaced apart relationship one with respect to the next adjacent one, means for moving said webs of substrate material from said slitting station to a film coating station, an extruder for extruding a plastic film disposed adjacent said coating station, means for moving said porous webs of substrate material past said coating station at a preselected speed in excess of the speed of extrusion of said film, said coating station being spaced with respect to said extruder to allow said film to be hot stretched therebetween, means for heating said film prior to application to the moving webs, means for applying vacuum beneath said moving webs at said coating station, and cooling means disposed adjacent said coating station for receiving the coated webs and for permanently bonding the film to the webs respectively, slitting means disposed adjacent said cooling means for receiving the cooled film and webs and for longitudinally slitting the films substantially medially of said space between the webs of substrate material forming overlapping portions of film, folding means disposed adjacent the slitting means for receiving the slitted film and webs and for folding over said overlapping portions of film around the adjacent edges to engage the back surfaces of said webs of substrate material respectively, heating means disposed adjacent said folding means for receiving the film and webs and for heating and adhering said overlapped portions of film to the back surfaces of the webs of substrate material respectively, and means disposed adjacent the heating and adhering means for receiving the adhered film and webs and for winding said film and webs of substrate material into rewind rolls, respectively.

30. A method of manufacturing packaging blanks comprising passing a plurality of webs of substrate material in parallel, spaced apart relationship through a film coating station, said webs being spaced one from the next adjacent one a distance between about ¼ inch to about ½ inch, taking a sheet of plastic film having a width substantially equal to the total width of said plurality of webs and permanently adhering said film to the surfaces of the webs of substrate material in said coating station, removing the adhered film and spaced webs of substrate material from the coating station, longitudinally slitting said film substantially medially of the spaces between the webs of substrate material forming overlapping portions of film, and folding over said overlapping portions of film around the adjacent edges of the webs to engage the back surface of said webs of substrate material respectively.

References Cited
UNITED STATES PATENTS

| | | | |
|---|---|---|---|
| 2,984,161 | 5/1961 | Cook et al. | 156—244 |
| 2,623,444 | 12/1952 | Maier et al. | 156—202 |
| 2,726,975 | 12/1955 | Hoag | 156—259 |
| 2,250,533 | 7/1941 | Hanson | 156—259 |
| 2,415,323 | 2/1947 | Wilcox | 229—3.1 X |
| 3,031,356 | 4/1962 | Bousquet et al. | |
| 2,873,566 | 2/1959 | Sylvester et al. | |
| 3,190,781 | 6/1965 | Metz | 156—500 XR |

PHILIP DIER, *Primary Examiner.*

UNITED STATES PATENT OFFICE
CERTIFICATE OF CORRECTION

Patent No. 3,399,096                          August 27, 1968

Hubert O. Ranger

It is certified that error appears in the above identified patent and that said Letters Patent are hereby corrected as shown below:

Column 13, line 19, "extension of" should read -- extrusion of --.

Signed and sealed this 17th day of February 1970.

(SEAL)
Attest:

Edward M. Fletcher, Jr.                   WILLIAM E. SCHUYLER, JR.
Attesting Officer                             Commissioner of Patents